United States Patent [19]
Dolder et al.

[11] 3,794,288
[45] Feb. 26, 1974

[54] BUTTERFLY VALVE

[75] Inventors: Guido Dolder; Alfred Schmalzi, both of Zurich, Switzerland

[73] Assignee: Escher Wyss Limited, Zurich, Switzerland

[22] Filed: Mar. 8, 1973

[21] Appl. No.: 339,308

[30] Foreign Application Priority Data
Mar. 16, 1972 Switzerland.................... 003902/72

[52] U.S. Cl..................................... 251/62, 251/58
[51] Int. Cl.......................................... F16k 31/143
[58] Field of Search................................ 251/58, 62

[56] References Cited
UNITED STATES PATENTS
506,220   10/1893   Furiakovics........................ 251/62 X
3,074,421  1/1963   Borcherdt.......................... 251/305 X FOREIGN PATENTS OR APPLICATIONS
37,999    2/1909   Austria ................................ 251/62
1,236,084 6/1960   France :............................... 251/305

Primary Examiner—Henry T. Klinksiek
Attorney, Agent, or Firm—Robert A. Ostmann; Austin P. Dodge

[57]  ABSTRACT

Butterfly valve for ducts of hydroelectric power stations, with a web in said duct, extending transversely of said duct and being rigidly secured to said duct, and a flap pivotably mounted on said web; a drive mechanism comprising a servo-motor and first connecting means between said flap and said servomotor and second connecting means between said servo-motor and said web; said connecting means being arranged in a plane crossing said duct and being perpendicular to the pivoting axis of said flap.

15 Claims, 6 Drawing Figures

BUTTERFLY VALVE

BACKGROUND OF THE INVENTION

The invention relates to a butterfly valve for regulating the flow of a fluid medium through a duct closed on all sides, more especially for pressure conduits of hydroelectric power stations, having a web which is secured to two opposite wall portions of the duct and extends across the duct, flap for closing the duct, situated in the duct and supported pivotably by the web, and a drive mechanism for pivoting the flap.

In the case of theses known butterfly valves the pivotable flap is mounted on the stationary web by means of a row of radial bearings. The drive mechanism for pivoting the flap is secured on the wall of the duct so that this wall has to be correspondingly strengthened.

SUMMARY OF THE INVENTION

The invention has as its object to relieve the wall of the duct substantially from the forces of the drive mechanism. A further aim is to allow the flap to be supported on the web in a simpler fashion.

This object is achieved in the case of a butterfly valve of the type initially described according to the invention in that the drive mechanism has a servo-motor which is connected on the one hand to the flap and on the other hand to the web, the connecting means between flap and servo-motor and between servo-motor and web being situated substantially in a plane which crosses the duct and extends at right angles to the pivoting axis of the flap.

A further advantageous feature of the butterfly valve is that the cross-section of the web has an edge and that the flap is supported pivotably on said edge, whereas for centering the flap on the pivoting axis there are arranged at least two bearings which support the dead weight of the flap.

Further advantageous features consist in that the servo-motor is situated within the duct; in that the main axis of the servo-motor extends at least approximately in the direction of flow of the fluid medium; and furthermore in that the servo-motor abuts directly on the web.

BRIEF DESCRIPTION OF THE DRAWING

Embodiments of the invention are shown in simplified manner in the drawing by means of which the invention will be explained in more detail.

In the drawing.

DESCRIPTION OF THE PREFERRED EMBODIMENTS

Figure 1:
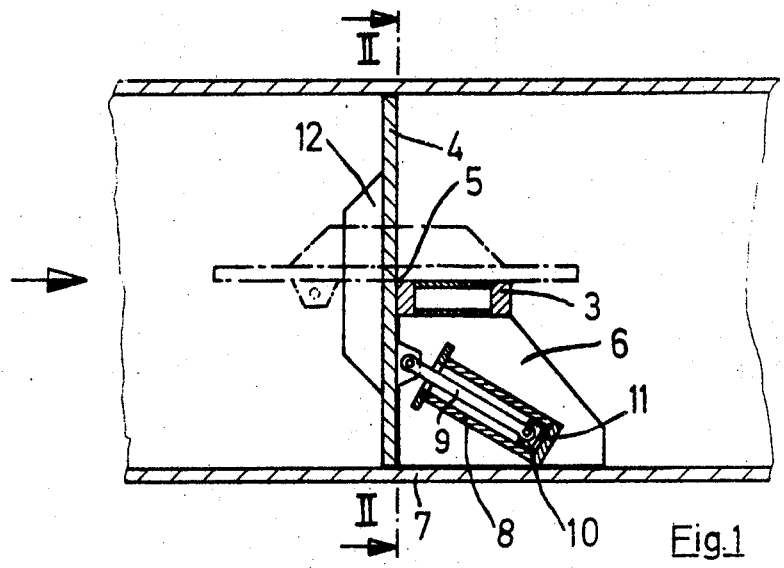
FIG. 1 shows an axial section through a butterfly valve.
Figure 2:
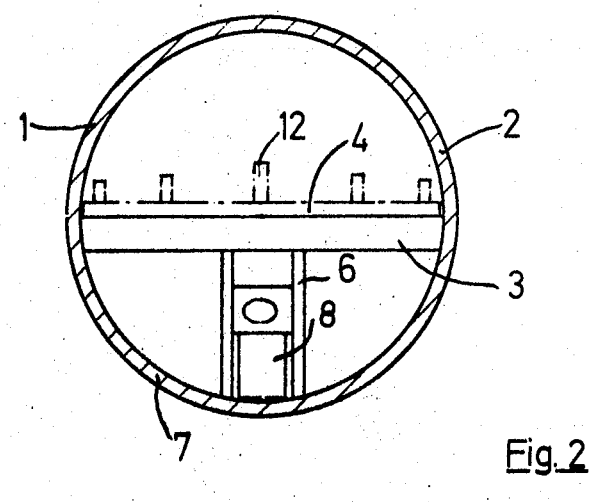
FIG. 2 a section taken on the line II—II of FIG. 1.

In the case of the butterfly valve for pressure conduits of hydroelectric power stations which is shown in FIG. 1 and 2, there is provided in a duct closed on all sides a web or plate 3 which is rigidly secured to opposite wall portions 1, 2 of the duct and is arranged transversely of the said duct. In FIG. 1, a flap 4 is shown in the closed position in full lines. Thus the flow of medium coming from the left in the drawing is interrupted. The load produced by the pressure difference present at the flap 4 is accepted by the web 3 and transmitted to the wall portions 1 and 2. The flap 4 is pivotably mounted on the web 3 and is shown in the open position in dot-dash lines in FIG. 1 and 2.

The pivoting axis of the flap 4 coincides with an edge 5 of the web 3 which is used for transmitting the load exerted by the flap 4 to the web 3. As shown in FIG. 1, the cross-section of the web 3 has a greater extent in the direction of flow than transversely thereto. This is advantageous in two respects, since the web in the closed position of the flap can accept a considerable load with a relatively small material outlay, and in the open position of the flap does not present much resistance to flow.

In the embodiment of FIG. 1, 2 there is also provided a support 6 which is arranged at right angles to the web 3 and connects the web 3 securely to a further wall portion 7 of the duct, which improves the load-bearing capacity of the web 3. This support 6 can be constructed as an abutment for the flap 4 in its closed position. As a result, part of the load in the closed position is accepted by this abutment when the valve disc has a closing tendency owing to eccentric arrangement of the pivoting axis. The support 6 is constructed as a twin support and in the space between the halves of the support there are arranged parts of a drive mechanism for the flap 4. This drive mechanism comprises a servo-motor 8 which is secured to the support 6 and is connected by means of a piston rod 9 to the flap 4 and whose cylinder chamber 11, which is situated at that side of the piston 10 opposite to the piston rod 9, contains controlled pressure medium.

To open the flap 4, the cylinder chamber 11 is subjected to pressure so that the piston 10 is pushed upwards whereas for closing the flap 4 the cylinder chamber 11 is relieved of pressure so that the flap closes under the action of the dead weight of the piston rod 9 and piston 10 and also because of the pressure exerted by the flowing fluid medium on the upper side of the piston 10. When the flap 4 is closed with the fluid medium flowing, owing to the special pressure distribution which occurs, a closing moment is brought about as known since the result in force acts on the flap 4 at a spacing from the pivoting axis. A part of the load is transmitted to the web 3 and part to the piston rod 9.

As FIG. 1 shows, the web 3 is arranged on the downstream side of the flap 4 in the closed position of the flap, and accepts the force exerted by the flap 4 in the form of a section load. Thus the web 3 can substantially prevent bending of the flap 4 along the pivoting axis. The flap 4 is reinforced against a bending action occurring at right angles thereto by ribs 12 which are situated in the direction of flow in the open position of the flap and therefore result in only a small pressure loss for the flowing fluid medium.

On the pivoting axis, which coincides with the edge 5 of the web 3, at least two bearings are arranged which are so dimensioned that they can accept the dead weight of the flap 4 and ensure that the flap 4 is centred on the pivoting axis. These bearings are not shown in FIG. 1 and 2.

Figure 3:
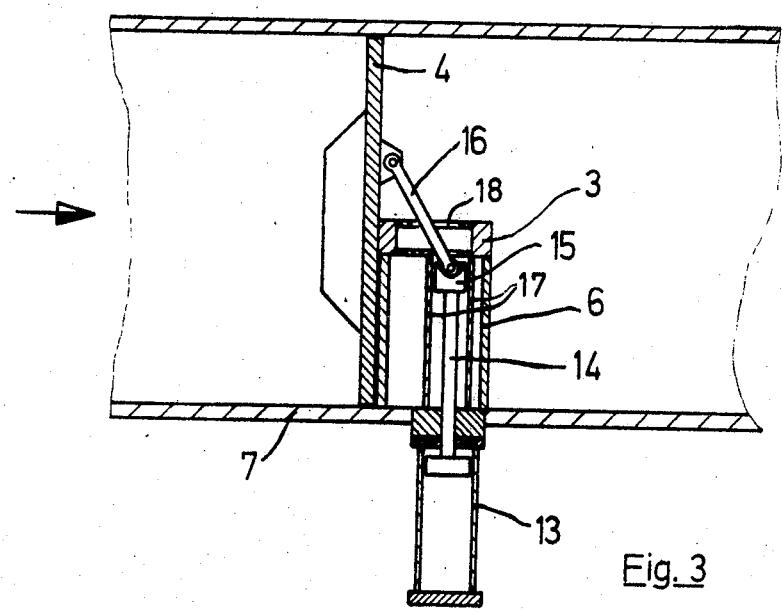
FIG. 3 an axial section through another butterfly valve.
Figure 6:
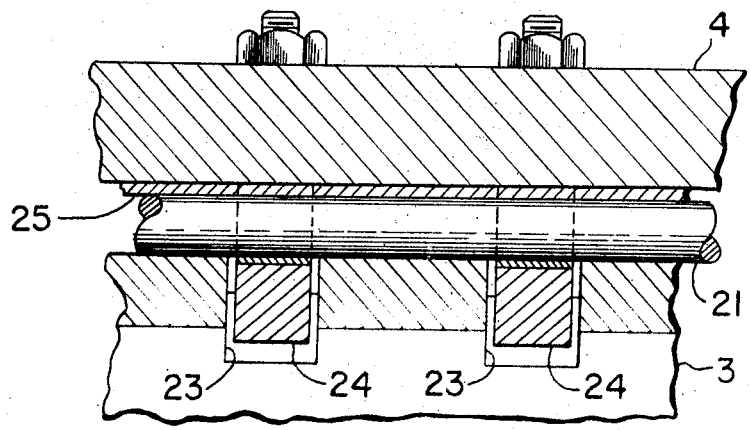
FIG. 6 is a sectional view taken on line VI—VI of FIG. 5.

In the embodiment shown in FIG. 3 a servo-motor 13 is arranged outside the wall of the duct. A piston rod 14 projects into a twin support 6 constructed as a hollow rib, where the piston rod is guided in longitudinal guides 17 by means of a cross head 15. A connecting rod 16 connects the flap 4 to the cross head 15. The web 3 comprises apertures 18 for the passage of the connecting rod 16. In the open position of the flap 4 the connecting rod 16 is situated entirely in the hollow space in the support 6 and protected from the flow of medium.

In the two embodiments described hitherto, the support 6 belongs to the connecting means between servo-motor 8 or 13 and web 3. Thus the drive line of the drive mechanism passes directly between flap 4, servo-motor 8 or 13 and web 3.

Instead of the hydraulic servo-motor 13 it would be possible to use a mechanical servo-motor which moves the cross head 15 up and down. This kind of drive mechanism could comprise a motor or could also be manually operated.

Figure 4:
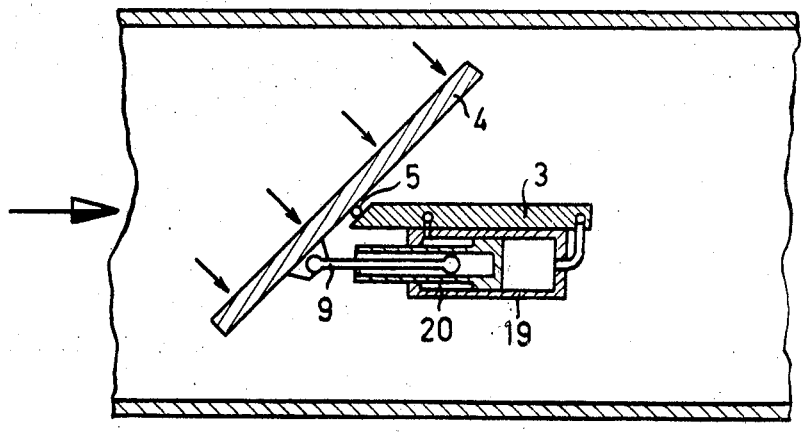
FIG. 4 an axial section through a further butterfly valve.

In the butterfly valve shown in FIG. 4 a servo-motor 19 is bolted directly to the web 3, i.e., the servo-motor 19 abuts on the web 3. In this way the line of drive of the drive mechanism is given the shortest path. Torsional stressing of the web 3 owing to the dynamic forces of the flowing medium acting on the flap 4 as the flap is being closed can, if desired, be reduced by means of a support corresponding to the support 6 in the other embodiments shown.

The main axis of the servo-motor 19 extends in the direction of flow of the fluid medium i.e., the flow of water under pressure which is to be regulated. In the open position of the flap 4 the flow resistance of all the parts situated in the duct is thus very small.

The pressure medium for operating the servo-motor 19 is guided through bores in the web 3 which can be connected laterally outside the duct to a control device not shown. The servo-motor 19 acts in principle like the servo-motor 8 in FIG. 1, but in this case pressure medium can be introduced additionally into a cylinder chamber 20 to support the closing movement.

Figure 5:
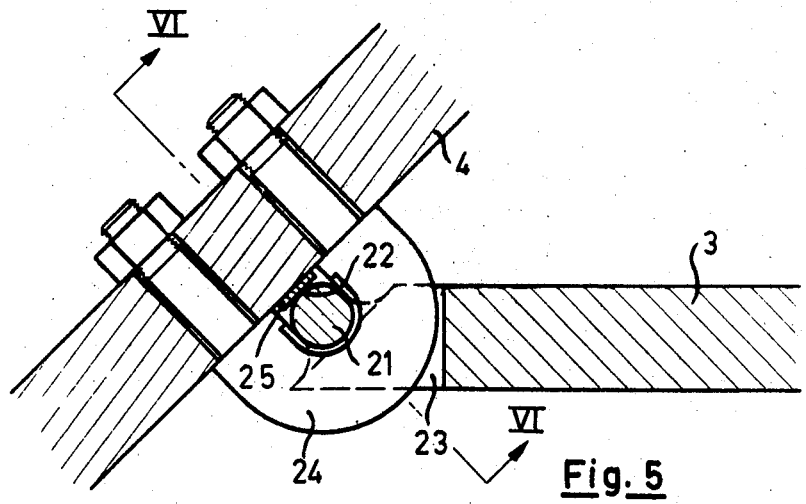
FIG. 5 a cross-section on a larger scale through a bearing for centring the flap shown in FIG. 4.

For the flap 4 shown in FIG. 4, as FIG. 5 shows, there is provided for supporting purposes over the entire length of the web 3 a round-section rod 21 which is welded to the web and has a rounded edge 5 with a cylindrical sliding surface 22 on which the flap 4 is linearly supported and pivotable about the axis of the surface 22, i.e., the axis of the rod 21. The round-section rod 21 bridges recesses 23 in the web 3 through which bearing stirrups 24 secured on the flap 4 extend. The advantage of supporting in this way resides in the easy manufacture, not requiring any narrow tolerances.

The rod 21 can consist for example of stainless steel and the co-operating surface provided on the flap can be formed by a strip 25 of bronze. The stirrups 24 can be lined with bronze at their internal side facing towards the rod 21 and can surround the rod with such adequate clearance that any bending actions of the web 3 and flap 4 are given sufficient freedom.

In the case of large flaps it may be necessary to provide more than one drive mechanism over the length of web 3 i.e., for example two servo-motors together with connecting means arranged in each case in a plane at right angles to the pivoting axis and crossing the duct.

The edge 5 or the rod 21 should extend over more than half the width of the flap, measured in the pivoting axis.

We claim:

1. In a butterfly valve having a duct which is closed on all sides, and a flap situated within said duct, for regulating the flow of a fluid medium through said duct, more especially for pressure conduits of hydroelectric power stations; a web extending transversely of said duct and being rigidly secured to two opposite wall portions of said duct; said flap being supported pivotably on said web; a drive mechanism for said flap, including a servo-motor, first connecting means between said flap and said servo-motor, and second connecting means between said servo-motor and said web; said connecting means being situated substantially in a plane crossing said duct and being perpendicular to the pivoting axis of said flap.

2. Butterfly valve according to claim 1, in which the cross-section of said web comprises an edge, said flap bearing pivotably on said edge; and at least two bearings for centering the flap on the pivoting axis, said bearings carrying the dead weight of said flap.

3. Butterfly valve according to claim 1, in which said servo-motor is situated in the interior of said duct.

4. Butterfly valve according to claim 3, in which the main axis of said servo-motor extends at least approximately in the direction of flow of the fluid medium.

5. Butterfly valve according to claim 3, in which said servo-motor abuts directly on said web.

6. Butterfly valve according to claim 1, in which said second connecting means between said servo-motor and said web comprise a support which is arranged at right angles to said web and is secured to said web as well as to a wall portion of said duct.

7. Butterfly valve according to claim 6, in which said support is a twin support having two halves, at least part of said connecting means being situated between said halves.

8. Butterfly valve according to claim 7, in which said twin support is constructed as a hollow rib, and said first connecting means between said flap and said servo-motor are, in the fully open position of said flap, situated in said rib.

9. Butterfly valve according to claim 2, in which said edge is rounded.

10. Butterfly valve according to claim 2, in which said edge extends over more than half the width of said flap, measured in the pivoting axis.

11. Butterfly valve according to claim 2, in which said edge extends substantially over the entire width of said flap, measured in the pivoting axis.

12. Butterfly valve according to claim 2, in which a round-section rod forms said edge, said rod being secured to said web.

13. Butterfly valve according to claim 12, in which said web comprises apertures which are bridged by said rod; and bearing stirrups secured on said flap, said stirrups extending through said apertures.

14. Butterfly valve according to claim 12, in which said rod consists of non-rusting material.

15. Butterfly valve according to claim 2, in which a strip secured on said flap bears on said edge.

* * * * *